(No Model.)
W. H. UMPLEBY.
WATER CLOSET.
No. 280,417.  Patented July 3, 1883.
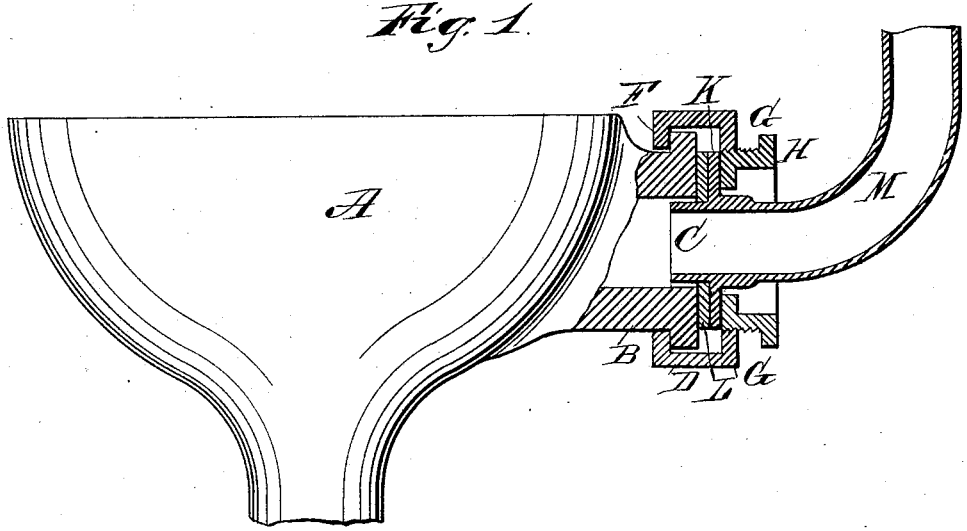
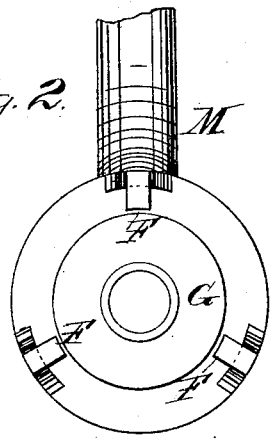
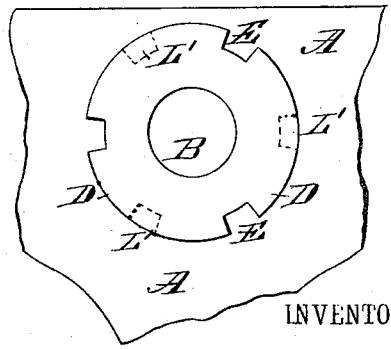
WITNESSES:
W. L. Bennem
T. C. Brecht
INVENTOR:
William H. Umpleby,
By Boyd Eliot
ATTORNEY.

UNITED STATES PATENT OFFICE.

WILLIAM H. UMPLEBY, OF TRENTON, NEW JERSEY.

WATER-CLOSET.

SPECIFICATION forming part of Letters Patent No. 280,417, dated July 3, 1883.

Application filed December 19, 1881. Renewed February 9, 1883. (No model.)

*To all whom it may concern:*

Be it known that I, WILLIAM H. UMPLEBY, residing in the city of Trenton, in the county of Mercer and State of New Jersey, have invented certain new and useful Improvements in Water-Closets, of which the following is a specification.

This invention pertains to certain improvements in water-closets in which the bowls or hoppers are made of earthenware and the couplings or pipe-connections are made of metal; and the invention consists in forming the socket for receiving the end of the sluice or water pipe with an external flange recessed to receive overreaching hooks from a metal collar surrounding the end of the metal pipe, which is provided with a flange, which is forced by a screw-nut against a packing-ring upon the end of the socket, so that a water-tight joint can be easily made without the use of cement, as will hereinafter appear.

Figure 1 of the drawings represents a side elevation of the ordinary bowl or hopper of a water-closet, upon the right side of which a sectional view of the socket and its connection to the water-pipe is also shown. Fig. 2 is an end view of the coupling and a portion of the water-pipe without the bowl. Fig. 3 is an end view of the socket on the bowl and without the coupling.

At A, Fig. 1, is represented the bowl, made of earthenware, and formed with a socket at B, partially in section to show the connections with the water-pipe at C, for conducting the water to the bowl for sluicing it. The end of the pipe C extends a short distance into the socket B, which is formed with a recessed external flange, D, the face of which has the notches at E to permit the introduction of hooks F, which extend from a ring, G, that surrounds the pipe C, and has a screw-thread cut on its interior surface to receive a screw-nut, H, which also surrounds the pipe C, and which works against a flange at K, formed on the pipe C to force it toward the end of the socket B to clamp an elastic washer at L between the flange K and the end of the socket. Consequently after the end of the pipe C is inserted in the socket B and the hooks F are extended over the flange D through the notches E, and are then rotated to a solid bearing on the inner face of the flange, as at L, (seen in Fig. 2,) and which may be in recesses, as at L', (shown in dotted lines,) and the nut at H is screwed up against the flange on the pipe, the washer L will be compressed, and the joint between the pipe and the end of the socket will thereby be made water-tight, according to the degree of pressure made by the compressing-nut. The portion of the pipe forming such connection may be curved, as shown at M, so that its outer end will be at a right angle to the inner end. Consequently the outer end may be turned to any position desired for connecting with the water-pipe—that is, it may be turned up, as shown in Fig. 1, or in any other position to suit the connecting-pipe, as it can be rotated to any position to suit the connection.

The compressing-nut may be turned by a wrench or key, or by pipe-tongs, and the washer may be of any suitable material, as rubber or leather.

I therefore claim—

1. The combination of the bowl or hopper, and the socket, of earthenware, having an external recessed flange, with the flanged pipe and the compression-nut working in the surrounding collar, with hooks or clamps to engage with the flanges on the socket, as hereinbefore set forth.

2. The combination of the socket B, pipe C, flange D, nut H, packing or washer L, and clamping devices, as hereinbefore set forth.

In witness whereof I have hereunto subscribed my name and affixed my seal in the presence of two subscribing witnesses.

WILLIAM H. UMPLEBY. [L. S.]

Witnesses:
EUGENE N. ELIOT,
LEWIS W. SCOTT.